(12) United States Patent
Guleryuz et al.

(10) Patent No.: US 10,469,874 B2
(45) Date of Patent: Nov. 5, 2019

(54) METHOD FOR ENCODING AND DECODING A MEDIA SIGNAL AND APPARATUS USING THE SAME

(71) Applicant: LG ELECTRONICS INC., Seoul (KR)

(72) Inventors: Onur Gonen Guleryuz, San Francisco, CA (US); Amir Said, Cupertino, CA (US); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 15/027,674

(22) PCT Filed: Oct. 7, 2014

(86) PCT No.: PCT/IB2014/003150
§ 371 (c)(1),
(2) Date: Apr. 6, 2016

(87) PCT Pub. No.: WO2015/068051
PCT Pub. Date: May 14, 2015

(65) Prior Publication Data
US 2016/0249067 A1    Aug. 25, 2016

Related U.S. Application Data

(60) Provisional application No. 61/887,960, filed on Oct. 7, 2013.

(51) Int. Cl.
*H04N 19/61*    (2014.01)
*H04N 19/132*   (2014.01)
(Continued)

(52) U.S. Cl.
CPC ........... *H04N 19/61* (2014.11); *H04N 19/103* (2014.11); *H04N 19/132* (2014.11);
(Continued)

(58) Field of Classification Search
None
See application file for complete search history.

(56) References Cited

U.S. PATENT DOCUMENTS

| | | | |
|---|---|---|---|
| 2005/0053145 A1* | 3/2005 | Hsu | H04N 19/52 375/240.16 |
| 2010/0074333 A1 | 3/2010 | Au et al. | |

(Continued)

FOREIGN PATENT DOCUMENTS

| | | |
|---|---|---|
| CN | 1813478 A | 8/2006 |
| CN | 100542287 C | 9/2009 |

(Continued)

OTHER PUBLICATIONS

XP 030080404: Limin Liu et al: "Enhanced Intra Predition Using Context-Adaptive Linear Prediction" pp. 1-4.

(Continued)

*Primary Examiner* — Anand S Rao
*Assistant Examiner* — Tyler B Edwards
(74) *Attorney, Agent, or Firm* — Dentons US LLP

(57) ABSTRACT

Disclosed herein is a method of encoding a video signal, comprising receiving an original video signal; comparing the original video signal with available reconstructed signals; determining a correction signal based on a result of the comparison; and generating a transform-coded correction signal to be transmitted for a signal reconstruction.

14 Claims, 11 Drawing Sheets

(51) Int. Cl.
    *H04N 19/177*     (2014.01)
    *H04N 19/147*     (2014.01)
    *H04N 19/103*     (2014.01)
    *H04N 19/18*     (2014.01)
    *H04N 19/19*     (2014.01)
    *H04N 19/62*     (2014.01)
    *H04N 19/94*     (2014.01)

(52) U.S. Cl.
    CPC ......... *H04N 19/147* (2014.11); *H04N 19/177* (2014.11); *H04N 19/18* (2014.11); *H04N 19/19* (2014.11); *H04N 19/62* (2014.11); *H04N 19/94* (2014.11)

(56) References Cited

U.S. PATENT DOCUMENTS

| | | | | |
|---|---|---|---|---|
| 2010/0195740 | A1* | 8/2010 | Jung | H03M 7/30 375/240.25 |
| 2012/0177299 | A1* | 7/2012 | Kato | H04N 19/593 382/233 |
| 2013/0058585 | A1* | 3/2013 | Lim | H04N 19/46 382/233 |

FOREIGN PATENT DOCUMENTS

| | | |
|---|---|---|
| CN | 101790848 A | 7/2010 |
| CN | 102595130 A | 7/2012 |
| CN | 103081463 A1 | 5/2013 |
| JP | 10164594 A | 6/1998 |
| JP | 2000-324494 A | 11/2000 |
| JP | 2007-538415 A | 12/2007 |
| KR | 10-2011-0123689 A | 11/2011 |
| KR | 10-2013-0096757 A | 8/2013 |

OTHER PUBLICATIONS

XP 031629140, Jianle Chen et al: "Adaptive linear prediction for block-based lossy image coding" Korea, pp. 2833-2836.

XP 030080111: Schumitsch, Brad, "Inter-Frame Optimization of Transform Coefficient Selection in Hybrid Video Coding," Picture Coding Symposium; Dec. 15, 2004-Dec. 17, 2004; San Francisco, CA (Stanford University), Dec. 15, 2004, pp. 1-6.

\* cited by examiner

【FIG. 1】
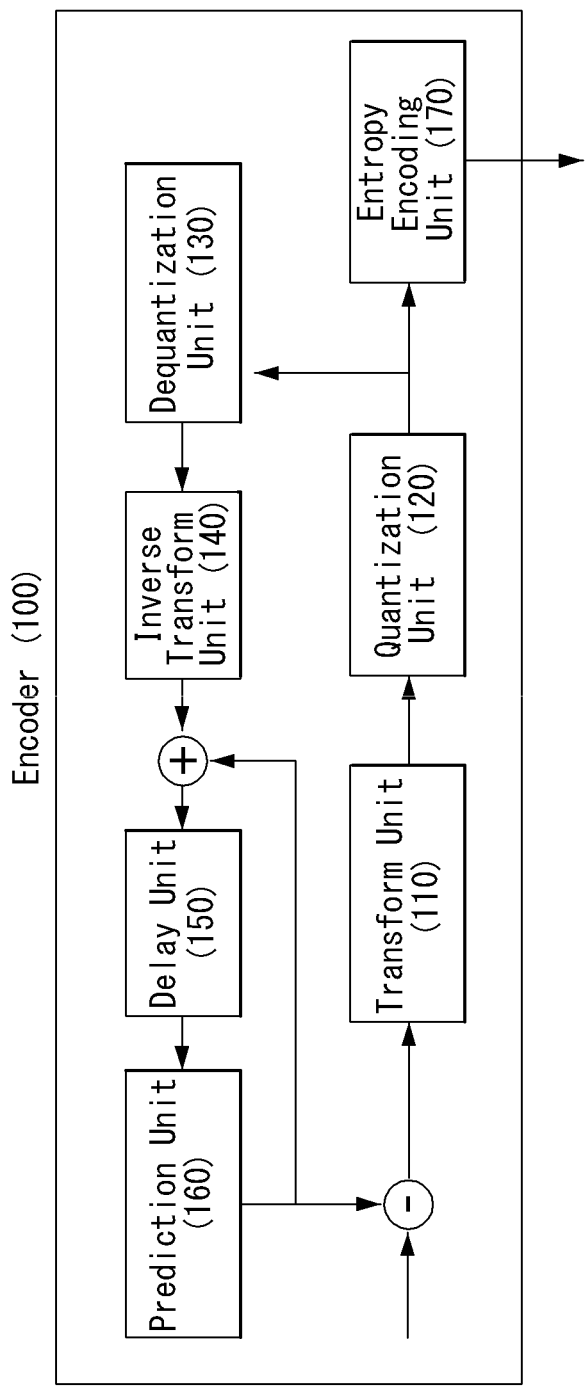

[FIG. 2]
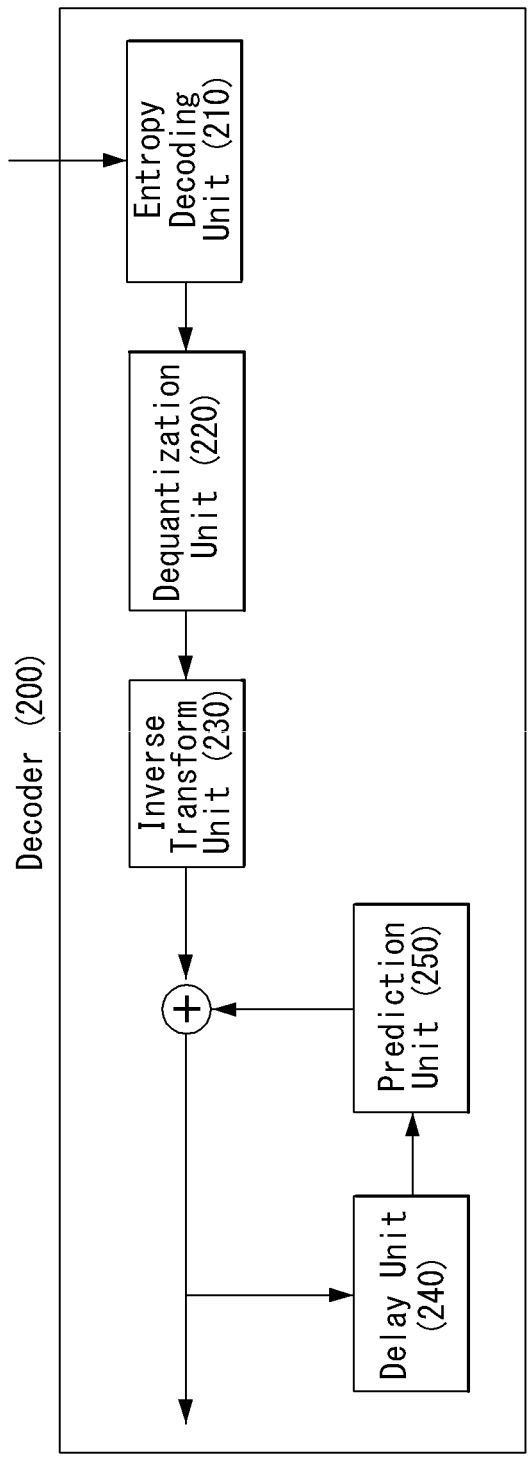

[FIG. 3]
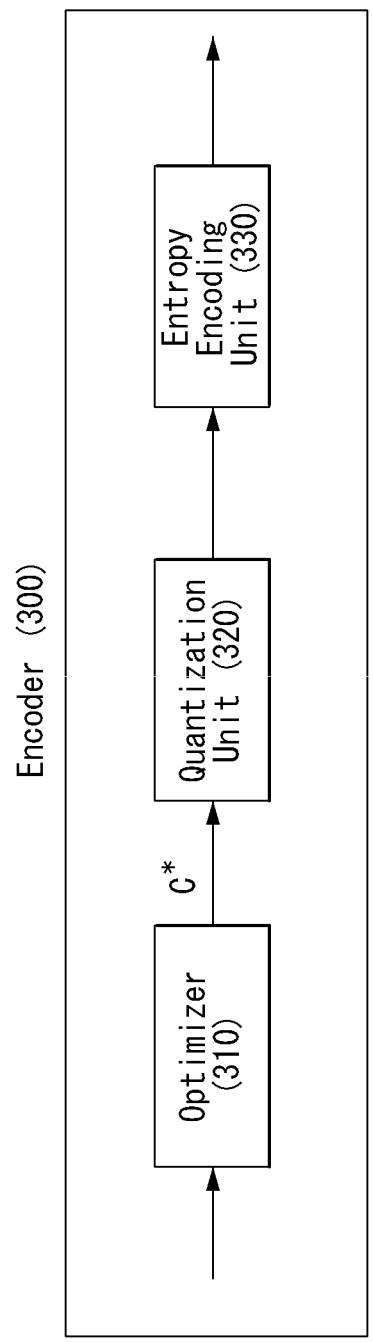

[FIG. 4]
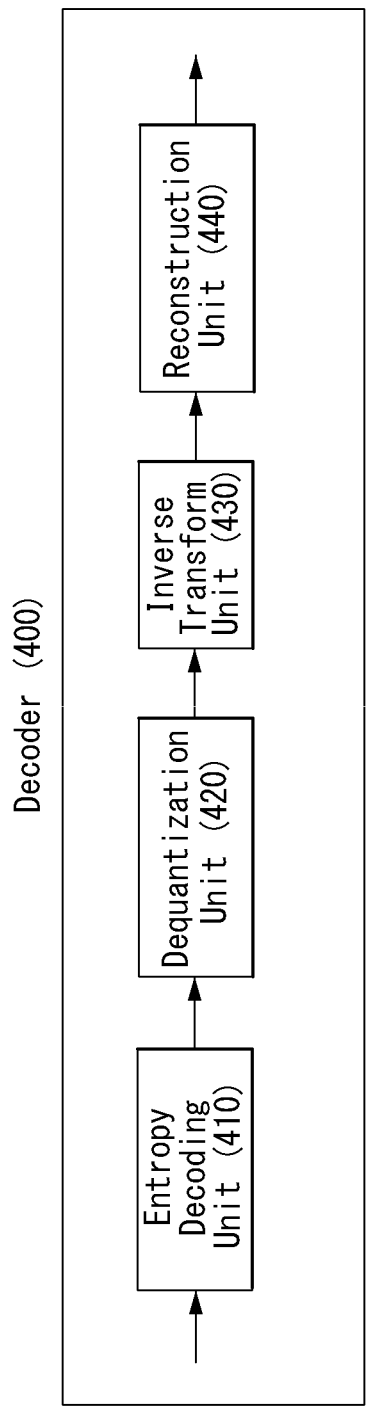

[FIG. 5]
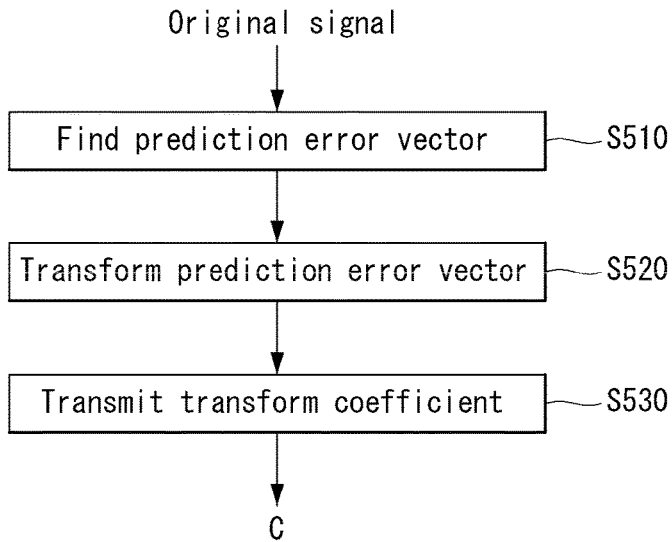
[FIG. 6]
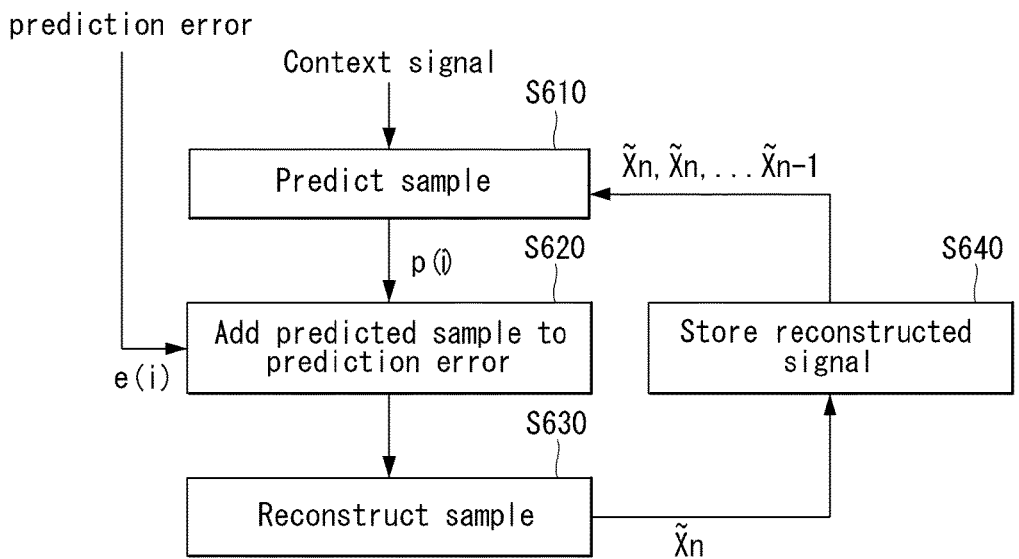

[FIG. 7]
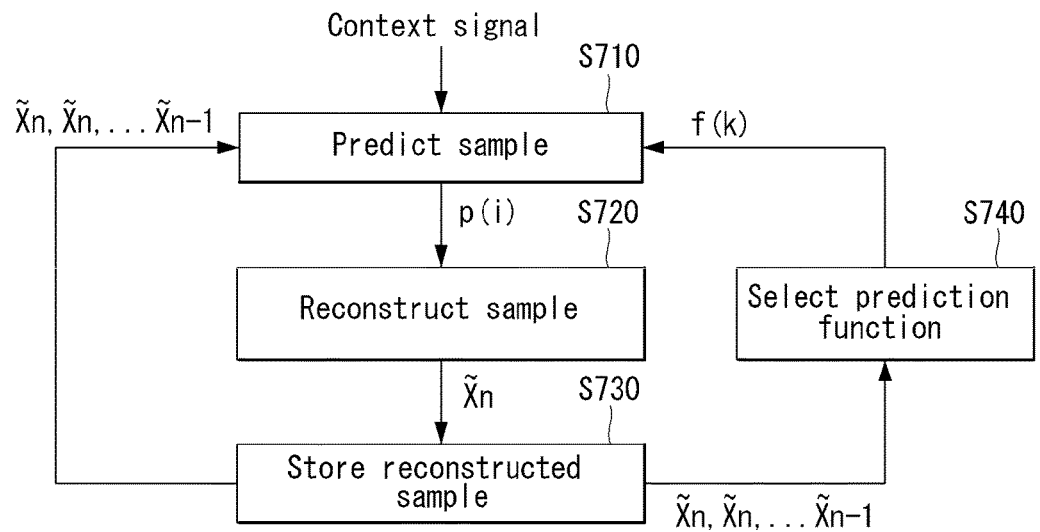
[FIG. 8]
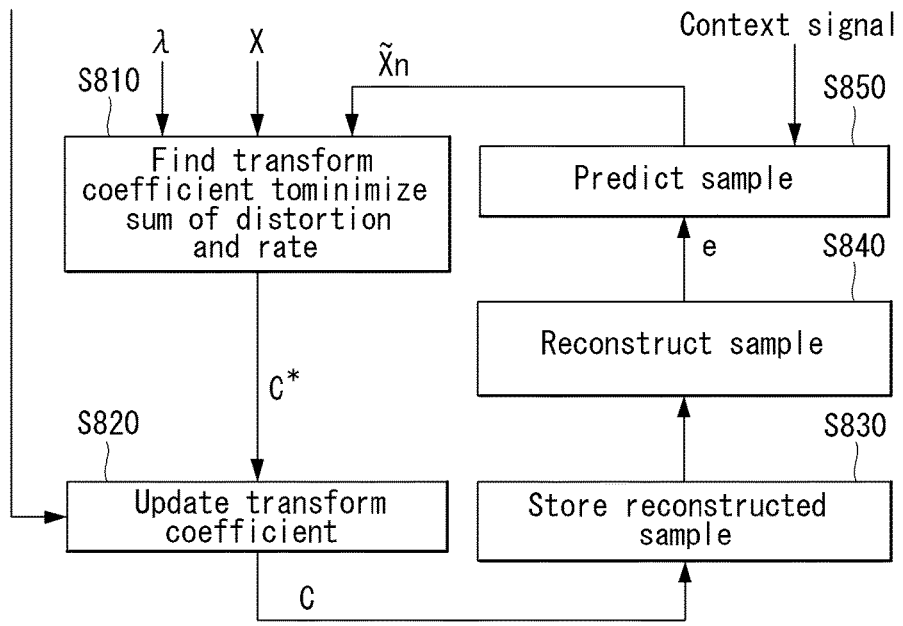

[FIG. 9]
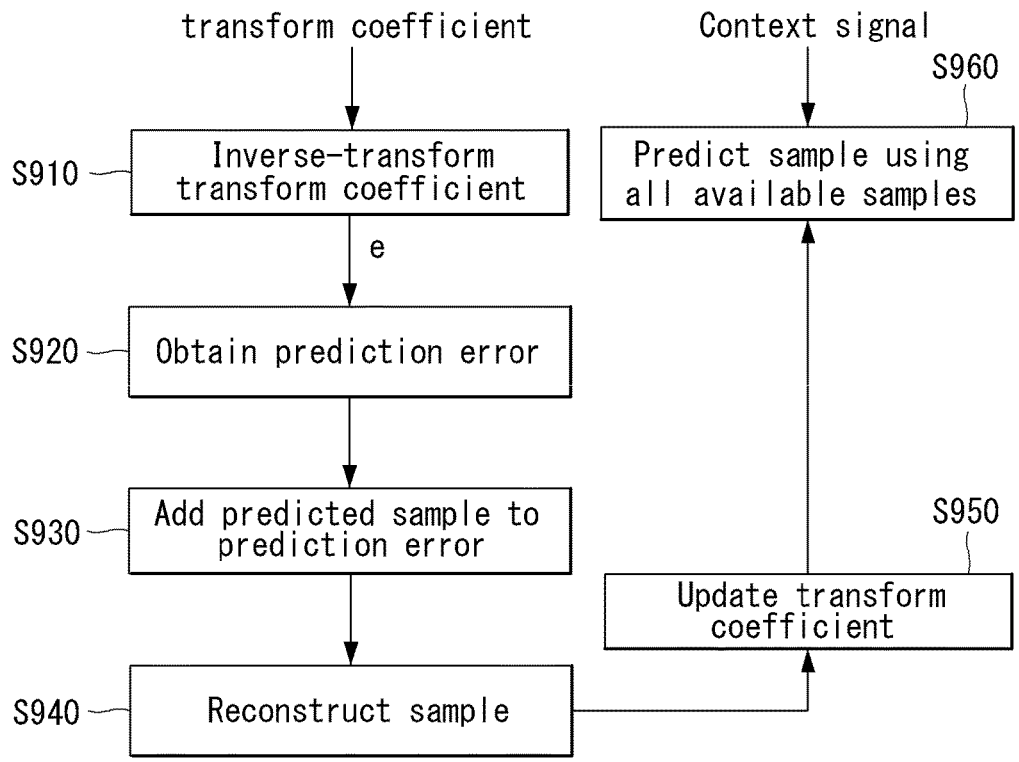
[FIG. 10]
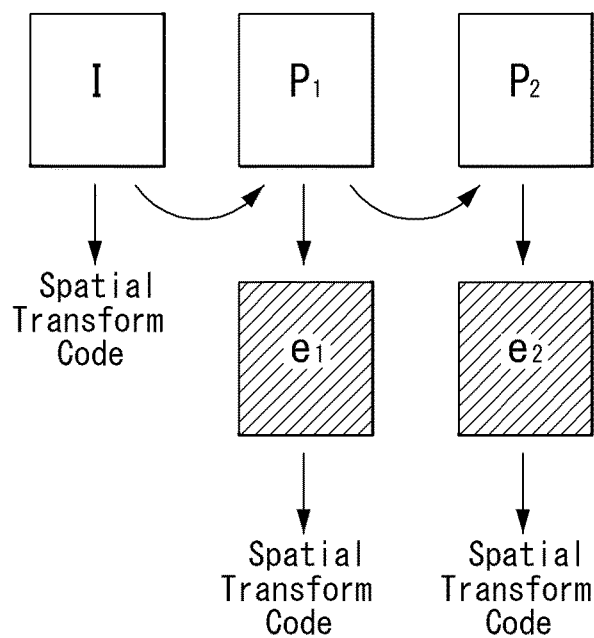

[FIG. 11]
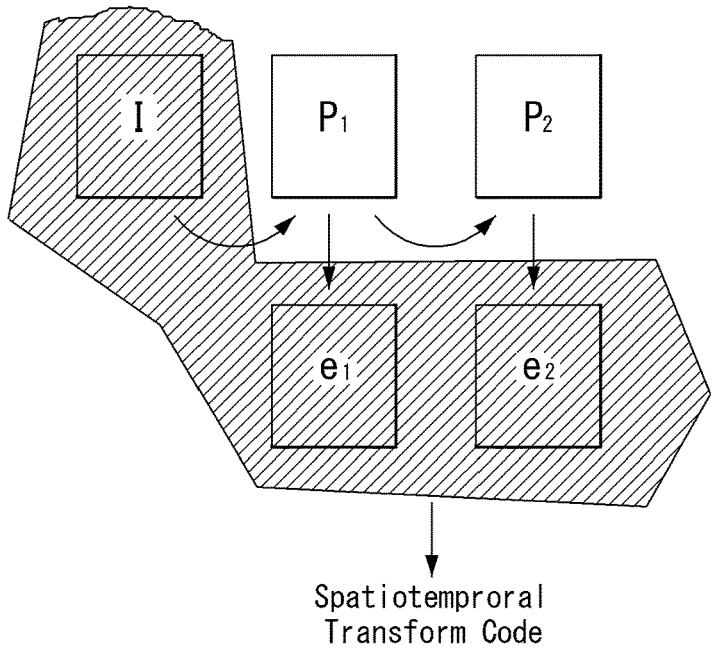
Spatiotemproral Transform Code
[FIG. 12]
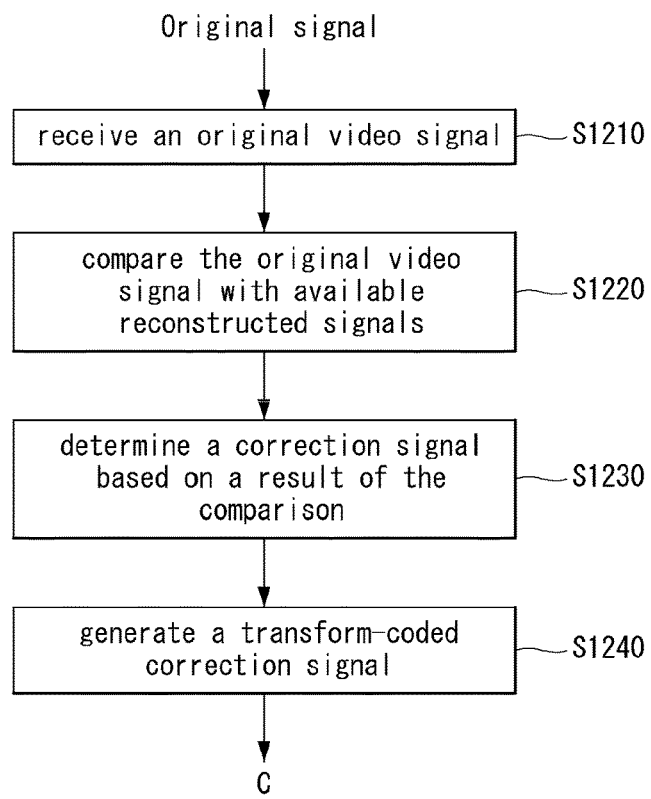

【FIG. 13】
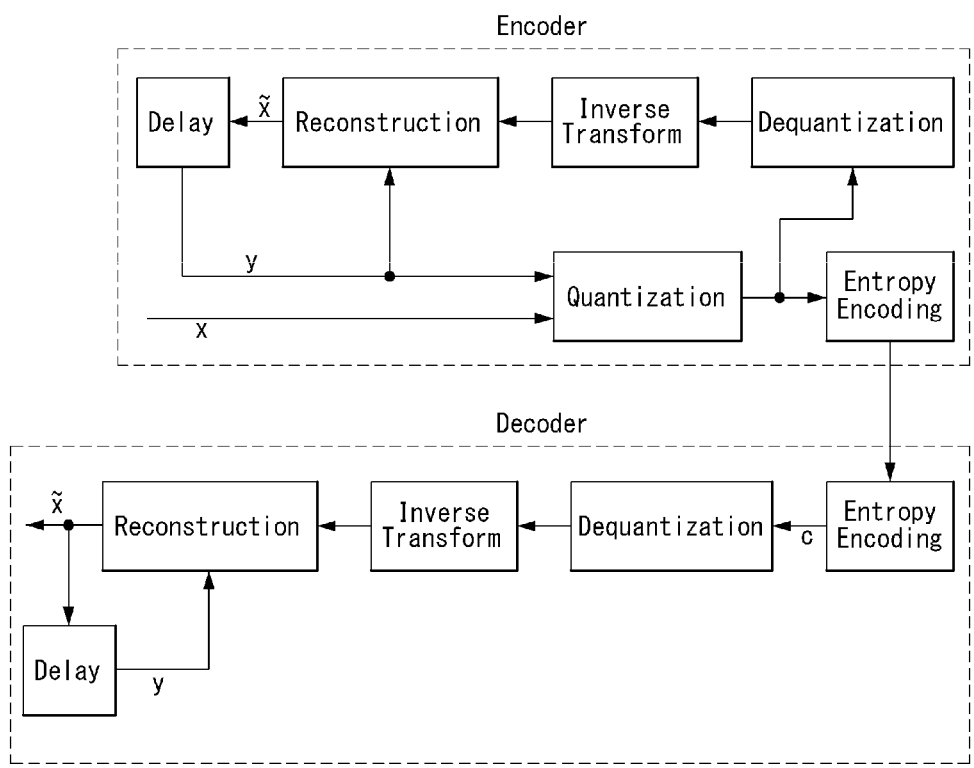

[FIG. 14]
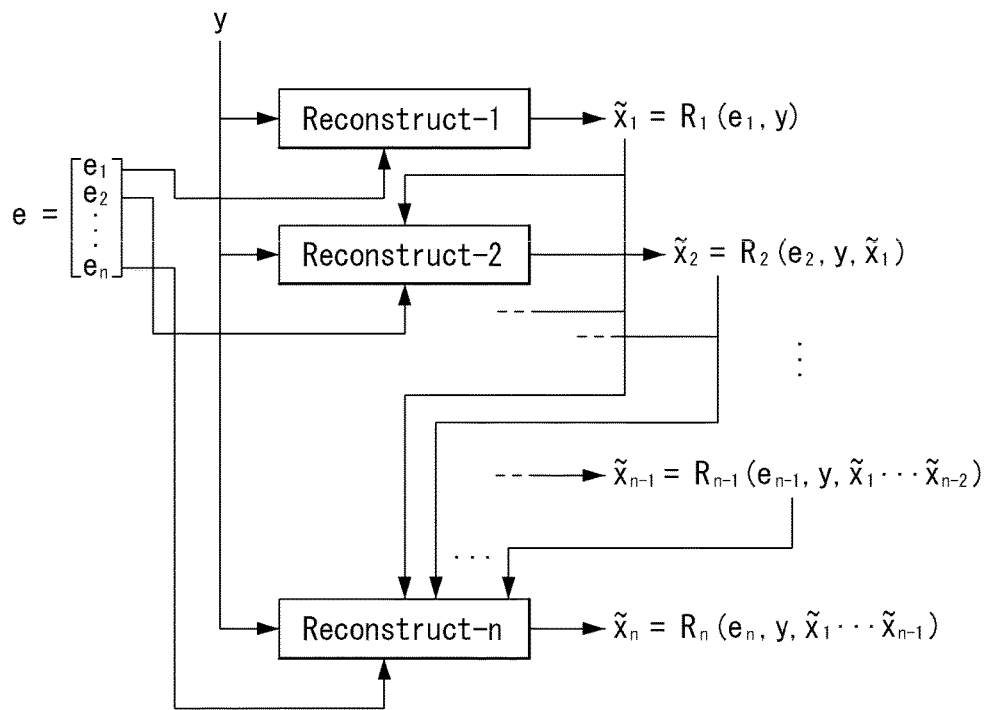
[FIG. 15]
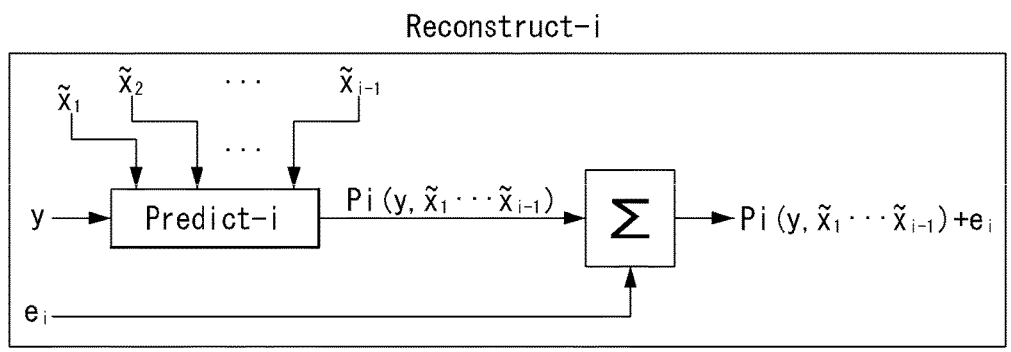

[FIG. 16]
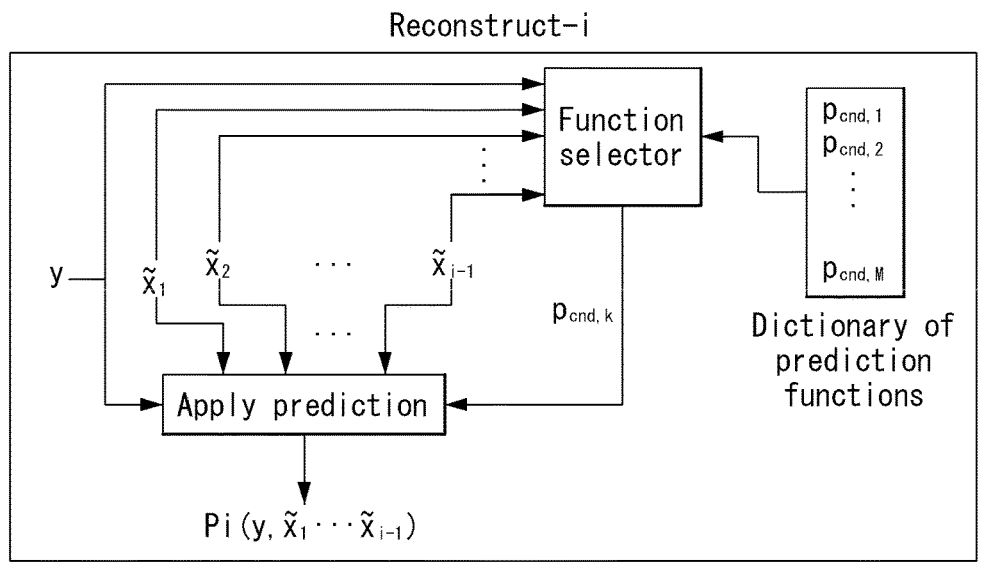
[FIG. 17]
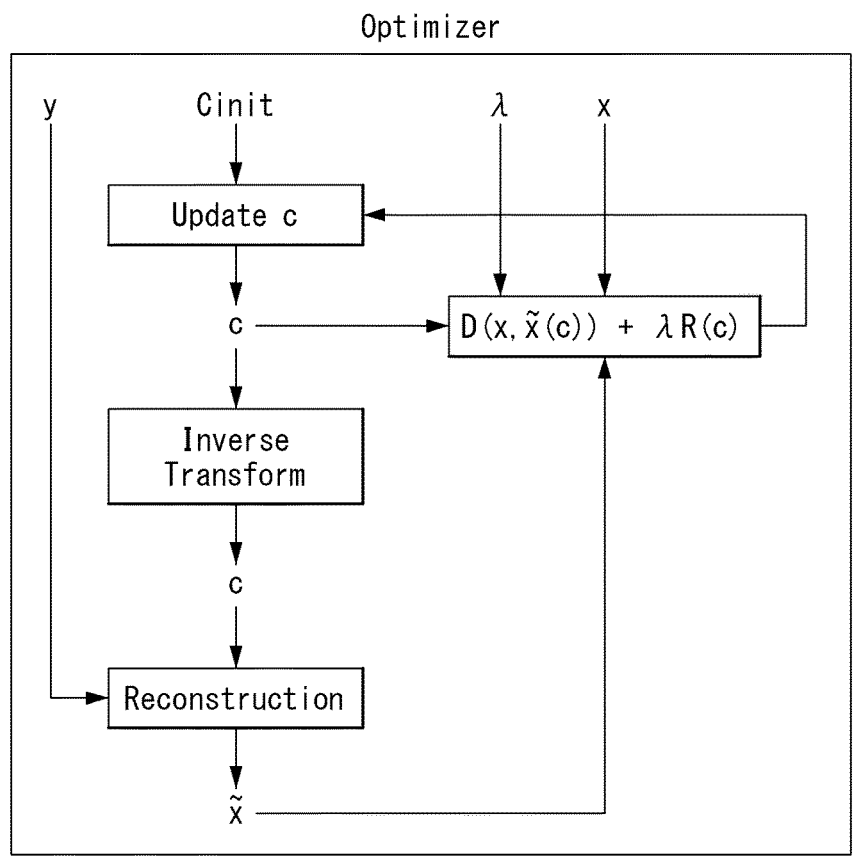

METHOD FOR ENCODING AND DECODING A MEDIA SIGNAL AND APPARATUS USING THE SAME

This application is a National Stage Application of International Application No. PCT/IB2014/003150, filed on Oct. 7, 2014, which claims the benefit of U.S. Provisional Application No. 61/887,960, filed on Oct. 7, 2013, all of which are hereby incorporated by reference in their entirety for all purposes as if fully set forth herein.

TECHNICAL FIELD

The present invention relates to a method for encoding and decoding a media signal and an apparatus using the same and, more particularly, to a prediction technique using non-linear transform.

BACKGROUND ART

Compression coding means a set of signal processing techniques for sending digitalized information through a communication line or storing digitalized information in a form suitable for a storage medium. Media, such as videos, images, and voice may be the subject of compression coding. In particular, a technique for performing compression coding on videos is called video compression.

Many media compression techniques are based on two types of approaches called predictive coding and transform coding. In particular, a hybrid coding technique adopts a method of combining the advantages of both predictive coding and transform coding for video coding, but each of the coding techniques has the following disadvantages.

In the case of predictive coding, any statistical dependency may not be used in obtaining predictive error samples. That is, predictive coding is based on a method of predicting signal components using parts of the same signal that have already been coded and coding the numerical difference between predicted and actual value. More specifically, predictive coding follows from information theory that predicted signals can be compressed more efficiently and may obtain a better compression effect by increasing the consistency and accuracy of prediction. Predictive coding is advantageous in processing non-smooth or non-stationary signals because it is based on causal statistics relationships, but is disadvantageous in that it is inefficient in processing signals at large scales. Furthermore, predictive coding is disadvantageous in that it may not use limitations of the human visual and auditory systems because quantization is applied to the original video signal.

Meanwhile, orthogonal transform, such as discrete cosine transform or discrete wavelet transform, may be used in transform coding. Transform coding is a technique for decomposing a signal into a set of components in order to identify the most important data. Most of the transform coefficient are 0 after quantization.

However, transform coding is disadvantageous in that it must depend on the first available data in obtaining the predictive value of samples. This makes it difficult for a prediction signal to have high quality.

DISCLOSURE

Technical Problem

The present invention is intended to propose a method capable of using all the advantages of the predictive/transform coding methods based on the convergence of the predictive/transform coding methods not used in the prior art.

The present invention is intended to replace linear/non-linear predictive coding block, combined with transform coding block, with a non-linear transform block.

The present invention is intended to replace a hybrid coding block, combined with a transform coding block, with an integrated non-linear transform block.

The present invention is intended to propose a method of more efficiently coding video of high picture quality including a non-smooth or non-stationary signal.

The present invention is intended to propose a method of performing coding by applying prediction and transform to a single dimension at the same time.

The present invention is intended to propose a method of performing coding using non-linear transform and vector quantization.

Technical Solution

In accordance with the present invention, the encoder can determine a correction signal by comparing the original video signal with available reconstructed signals, and can generate a transform-coded correction signal to be transmitted for a signal reconstruction.

Furthermore, in accordance with the present invention, a correction signal may be obtained by performing inverse-transform to the transform-coded correction signal, and a reconstructed signal may be obtained by using a reconstruction function that combines the obtained correction signal and a context signal. Here, the context signal may be obtained based on all previously reconstructed samples.

Furthermore, in accordance with the present invention, an optimized prediction signal can be generated because all the signals that have already been reconstructed are taken into consideration when a prediction process is performed.

Furthermore, in accordance with the present invention, a non-linear prediction function can be selected as a prediction function for generating a prediction signal.

Furthermore, in accordance with the present invention, an optimized non-linear prediction function for generating an optimized prediction signal can be selected, and the optimized non-linear prediction function can be selected from candidate functions stored in a storage space.

Furthermore, in accordance with the present invention, all the signals that have already been reconstructed and a context signal can be used to select an optimized prediction function.

Furthermore, in accordance with the present invention, in order to obtain optimized transform coefficient, a candidate function for minimizing the sum of a distortion measurement value and a rate measurement value can be searched for.

Furthermore, in accordance with the present invention, a prediction signal can be generated by obtaining an optimized transform coefficient for minimizing the sum of a distortion measurement value and a rate measurement value and updating the obtained transform coefficient.

Advantageous Effects

In accordance with the present invention, advantages of each of the predictive coding and transform coding methods can be taken by converging the predictive coding and transform coding methods. That is, more precise and advanced prediction can be performed using all the signals that have already been reconstructed, and statistical dependency of predictive error samples can be used.

Furthermore, video of high picture quality including a non-smooth or non-stationary signal can be coded more efficiently because coding is performed by applying prediction and transform to a single dimension at the same time.

Furthermore, a prediction error included in a prediction error vector can be controlled because each of decoded transform coefficients affects the entire reconstruction process. That is, a quantization error propagation problem can be solved because quantization errors are fully taken into consideration and controlled.

In accordance with the present invention, signal-adaptive decoding can be performed without a need for supplementary information. Furthermore, compared to an existing hybrid coder, high picture-quality prediction is possible and a prediction error can also be reduced.

Furthermore, in accordance with the present invention, efficient coding can be performed on video having great motion dependency or significant space boundary characteristics because a more advanced spatiotemporal video compression method is used.

DESCRIPTION OF DRAWINGS

FIGS. 1 and 2 illustrate schematic block diagrams of an encoder and a decoder in which media coding is performed;

FIGS. 3 and 4 are embodiments to which the present invention may be applied and are schematic block diagrams illustrating an encoder and a decoder to which an advanced coding method may be applied;

FIG. 5 is an embodiment to which the present invention may be applied and is a schematic flowchart illustrating an advanced video coding method;

FIG. 6 is an embodiment to which the present invention may be applied and is a flowchart illustrating an advanced video coding method for generating an optimized prediction signal;

FIG. 7 is an embodiment to which the present invention may be applied and is a flowchart illustrating a process of generating an optimized prediction signal;

FIG. 8 is an embodiment to which the present invention may be applied and is a flowchart illustrating a method of obtaining an optimized transform coefficient;

FIG. 9 is an embodiment to which the present invention may be applied and is a schematic flowchart illustrating the operation of the decoder to which the advanced coding method may be applied;

FIG. 10 is an embodiment to which the present invention may be applied and illustrates a known transform method in a space domain;

FIG. 11 is an embodiment to which the present invention may be applied and illustrates a method of applying spatiotemporal transform to a GOP;

FIG. 12 is an embodiment to which the present invention may be applied and is a schematic flowchart illustrating an advanced video coding method; and FIGS. 13 to 17 are embodiments to which the present invention may be applied.

BEST MODE

An embodiment of the present invention provides a method of encoding a video signal, comprising receiving an original video signal; comparing the original video signal with available reconstructed signals; determining a correction signal based on a result of the comparison; and generating a transform-coded correction signal to be transmitted for a signal reconstruction.

In an aspect of the present invention, the method includes determining a reconstruction function to be used for the signal reconstruction, wherein the reconstruction function includes at least one of a linear component and a non-linear component.

In an aspect of the present invention, the reconstruction function is determined based on all the previously reconstructed samples and the correction signal.

In an aspect of the present invention, the correction signal is determined to minimize a sum of a distortion component and a rate component, the distortion component is indicative of total distortion between the original video signal and the correction signal, and the rate component is indicative of a number of bits required to send the transform-coded correction signal.

In an aspect of the present invention, wherein the transform-coded correction signal is multiplied by a dequantization matrix and an inverse-transform matrix, and wherein the dequantization matrix is selected for controlling a bit-rate and quantization errors.

In an aspect of the present invention, the transform-coded correction signal corresponds to the correction signal for a group of pictures and a spatiotemporal transform coding has been applied to the correction signal.

An embodiment of the present invention provides a method of decoding a video signal, comprising receiving a transform-coded correction signal; obtaining a correction signal by performing inverse-transform to the transform-coded correction signal; and obtaining a reconstructed signal using a reconstruction function that combines the obtained correction signal and a context signal, wherein the context signal is obtained based on all previously reconstructed samples.

In an aspect of the present invention, the method includes determining the reconstruction function to be used for the signal reconstruction, wherein the reconstruction function includes at least one of a linear component and a non-linear component.

In an aspect of the present invention, the reconstruction function is determined based on all the previously reconstructed samples and the correction signal.

In an aspect of the present invention, the transform-coded correction signal is multiplied by a dequantization matrix and an inverse-transform matrix.

In an aspect of the present invention, the transform-coded correction signal corresponds to the correction signal for a group of pictures and a spatiotemporal transform coding has been applied to the correction signal.

An embodiment of the present invention provides a apparatus of encoding a video signal, comprising a receiving unit configured to receive an original video signal; an optimization unit configured to compare the original video signal with available reconstructed signals, and determine a correction signal based on a result of the comparison, and generate a transform-coded correction signal to be transmitted for a signal reconstruction.

In an aspect of the present invention, the optimization unit is further configured to determine a reconstruction function to be used for the signal reconstruction, wherein the reconstruction function includes at least one of a linear component and a non-linear component.

In an aspect of the present invention, the reconstruction function is determined based on all the previously reconstructed samples and the correction signal.

In an aspect of the present invention, the correction signal is determined to minimize a sum of a distortion component and a rate component, the distortion component is indicative of total distortion between the original video signal and the correction signal, and the rate component is indicative of a number of bits required to send the transform-coded correction signal.

In an aspect of the present invention, the transform-coded correction signal corresponds to the correction signal for a group of pictures and a spatiotemporal transform coding has been applied to the correction signal.

An embodiment of the present invention provides a apparatus of decoding a video signal, comprising a receiving unit configured to receive a transform-coded correction signal; an inverse-transform unit configured to obtain a correction signal by performing inverse-transform to the transform-coded correction signal; and a reconstruction unit configured to obtain a reconstructed signal using a reconstruction function that combines the obtained correction signal and a context signal, wherein the context signal is obtained based on all previously reconstructed samples.

In an aspect of the present invention, the reconstruction unit is further configured to determine the reconstruction function to be used for the signal reconstruction, wherein the reconstruction function includes at least one of a linear component and a non-linear component.

In an aspect of the present invention, the reconstruction function is determined based on all the previously reconstructed samples and the correction signal.

In an aspect of the present invention, the transform-coded correction signal corresponds to the correction signal for a group of pictures and a spatiotemporal transform coding has been applied to the correction signal.

An embodiment of the present invention provides a method of encoding a video signal, including receiving an original video signal, generating a prediction signal based on all previously reconstructed samples and a first transform-coded coefficient, generating a prediction error signal by subtracting the prediction signal from the original video signal, and obtaining a second transform-coded coefficient by transforming the prediction error signal.

In an aspect of the present invention, the method includes determining a prediction function for generating the prediction signal, wherein the prediction signal is generated based on the determined prediction function, and the determined prediction function includes a non-linear prediction function.

In an aspect of the present invention, the prediction function is determined to be a function that minimizes the sum of a distortion component and a rate component, wherein the distortion component is indicative of total distortion between the original video signal and a reconstructed signal and the rate component is indicative of the number of bits required to send a transform coefficient.

In an aspect of the present invention, the prediction function is determined based on all the previously reconstructed samples and a context signal.

In an aspect of the present invention, the determining step comprises selecting a quantization matrix that minimizes a sum of a distortion component and a rate component, and the quantization matrix is used for quantization control.

In an aspect of the present invention, the prediction error signal is represented in a vector form.

An embodiment of the present invention provides a method of decoding a video signal, including receiving a first transform-coded coefficient, obtaining a prediction error signal by performing inverse transform on the first transform-coded coefficient, and obtaining a reconstructed signal using the prediction error signal and a prediction signal, wherein the prediction signal is obtained based on all previously reconstructed samples and a second transform-coded coefficient.

In an aspect of the present invention, the second transform-coded coefficient is indicative of a value obtained based on a prediction function that minimizes the sum of a distortion component and a rate component, wherein the distortion component is indicative of total distortion between the original video signal and a reconstructed signal and the rate component is indicative of the number of bits required to send a transform coefficient.

In an aspect of the present invention, the prediction function is determined based on all the previously reconstructed samples and a context signal, and the prediction function is a non-linear prediction function.

In an aspect of the present invention, the prediction function is determined by using a quantization matrix for controlling quantization errors.

In an aspect of the present invention, the first transform-coded coefficient corresponds to a prediction error vector for a group of pictures, and a spatiotemporal transform coding has been applied to the prediction error vector.

MODE FOR INVENTION

Hereinafter, exemplary elements and operations in accordance with embodiments of the present invention are described with reference to the accompanying drawings. The elements and operations of the present invention that are described with reference to the drawings illustrate only embodiments, which do not limit the technical spirit of the present invention and core constructions and operations thereof.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be interpreted as being based on the name of a term used in a corresponding description of this specification, but should be interpreted by checking the meaning of a corresponding term.

Furthermore, terms used in this specification are common terms selected to describe the invention, but may be replaced with other terms for more appropriate analyses if other terms having similar meanings are present. For example, a signal, data, a sample, a picture, a frame, and a block may be properly replaced and interpreted in each coding process.

FIGS. 1 and 2 illustrate schematic block diagrams of an encoder and a decoder in which media coding is performed.

The encoder 100 of FIG. 1 includes a transform unit 110, a quantization unit 120, a dequantization unit 130, an inverse transform unit 140, a delay unit 150, a prediction unit 160, and an entropy encoding unit 170. The decoder 200 of FIG. 2 includes an entropy decoding unit 210, a dequantization unit 220, an inverse transform unit 230, a delay unit 240, and a prediction unit 250.

The encoder 100 receives the original video signal and generates a prediction error by subtracting a predicted signal, output by the prediction unit 160, from the original video signal. The generated prediction error is transmitted to the transform unit 110. The transform unit 110 generates a transform coefficient by applying a transform scheme to the prediction error.

The transform scheme may include, for example, a block-based transform method and an image-based transform method. The block-based transform method may include, for example, Discrete Cosine Transform (DCT) and Karhuhen-Loeve Transform. The DCT means that a signal on a space domain is decomposed into two-dimensional frequency components. A pattern having lower frequency components toward an upper left corner within a block and higher frequency components toward a lower right corner within the block is formed. For example, only one of 64 two-dimensional frequency components that is placed at the top left corner may be a Direct Current (DC) component and may have a frequency of 0. The remaining frequency components may be Alternate Current (AC) components and may include 63 frequency components from the lowest frequency component to higher frequency components. To perform the DCT includes calculating the size of each of base components (e.g., 64 basic pattern components) included in a block of the original video signal, the size of the base component is a discrete cosine transform coefficient.

Furthermore, the DCT is transform used for a simple expression into the original video signal components. The original video signal is fully reconstructed from frequency components upon inverse transform. That is, only a method of representing video is changed, and all the pieces of information included in the original video in addition to redundant information are preserved. If DCT is performed on the original video signal, DCT coefficients are crowded at a value close to 0 unlike in the amplitude distribution of the original video signal. Accordingly, a high compression effect can be obtained using the DCT coefficients.

The quantization unit 120 quantizes the generated transform coefficient and sends the quantized coefficient to the entropy encoding unit 170. The entropy encoding unit 170 performs entropy coding on the quantized signal and outputs an entropy-coded signal.

The quantized signal output by the quantization unit 120 may be used to generate a prediction signal. For example, the dequantization unit 130 and the inverse transform unit 140 within the loop of the encoder 100 may perform dequantization and inverse transform on the quantized signal so that the quantized signal is reconstructed into a prediction error. A reconstructed signal may be generated by adding the reconstructed prediction error to a prediction signal output by the prediction unit 160.

The delay unit 150 stores the reconstructed signal for the future reference of the prediction unit 160. The prediction unit 160 generates a prediction signal using a previously reconstructed signal stored in the delay unit 150.

The decoder 200 of FIG. 2 receives a signal output by the encoder 100 of FIG. 1. The entropy decoding unit 210 performs entropy decoding on the received signal. The dequantization unit 220 obtains a transform coefficient from the entropy-decoded signal based on information about a quantization step size. The inverse transform unit 230 obtains a prediction error by performing inverse transform on the transform coefficient. A reconstructed signal is generated by adding the obtained prediction error to a prediction signal output by the prediction unit 250.

The delay unit 240 stores the reconstructed signal for the future reference of the prediction unit 250. The prediction unit 250 generates a prediction signal using a previously reconstructed signal stored in the delay unit 240.

Predictive coding, transform coding, and hybrid coding may be applied to the encoder 100 of FIG. 1 and the decoder 200 of FIG. 2. A combination of all the advantages of predictive coding and transform coding is called hybrid coding.

A problem when such an approach is used in hybrid coding is that prediction residuals need to be grouped prior to transform. In such a case, the prediction of the cyclic structure may lead to an increase of accumulated errors because a signal may not be precisely reconstructed.

In existing inter-frame hybrid coding, prediction and transform are separated in two orthogonal dimensions. For example, in the case of video coding, prediction is adopted in a time domain and transform is adopted in a space domain. Furthermore, in existing hybrid coding, prediction is performed from only data within a previously coded block. Accordingly, an embodiment of the present invention is intended to solve such problems by removing constraints on data that may be used in a prediction process and enabling a new hybrid coding form in which the advantages of predictive coding and transform coding are integrated.

FIGS. 3 and 4 are embodiments to which the present invention may be applied and are schematic block diagrams illustrating an encoder and a decoder to which an advanced coding method may be applied.

The encoder 300 of FIG. 3 includes an optimizer 310, a quantization unit 320, and an entropy encoding unit 330. The decoder 400 of FIG. 4 includes an entropy decoding unit 410, a dequantization unit 420, an inverse transform unit 430, and a reconstruction unit 440.

Referring to the encoder 300 of FIG. 3, the optimizer 310 obtains an optimized transform-coded correction signal. The optimizer 310 may use the following embodiments in order to obtain the optimized transform-coded correction signal.

In order to illustrate an embodiment to which the present invention may be applied, first, a reconstruction function for reconstructing a signal may be defined as follows.

$$\tilde{x} = R(c, y) \qquad \text{[Equation 1]}$$

In Equation 1, $\tilde{x}$ denotes a reconstructed signal, c denotes a decoded transform-coded correction signal, and y denotes a context signal. $R(c, y)$ denotes a reconstruction function using c and y in order to generate a reconstructed signal.

In the present embodiment, a reconstruction function may be defined as a relationship between previously reconstructed values and a transform-coded correction signal. Accordingly, the decoded correction signal affects not only the reconstruction value, but also the entire reconstruction process and the choice of reconstruction functions.

For example, a correction signal may be defined as follows.

$$e = Tc \qquad \text{[Equation 2]}$$

In Equation 2, e denotes a correction signal, c denotes a transform-coded correction signal, and T denotes a transform matrix. Also, in some cases, the correction signal may mean error signal or prediction error signal.

In this case, a reconstructed signal may be defined as follows.

$$\begin{aligned}
\tilde{x}_1 &= R_1(e, y) \\
\tilde{x}_2 &= R_2(e, y, \tilde{x}_1) \\
&\vdots \\
\tilde{x}_n &= R_n(e, y, \tilde{x}_1, \tilde{x}_2 \ldots, \tilde{x}_{n-1})
\end{aligned} \qquad \text{[Equation 3]}$$

In Equation 3, $\tilde{x}_n$ denotes an $n^{th}$ component of the reconstructed signal, e denotes the correction signal, and y denotes a context signal. $R_n$ denotes a reconstruction function using e, y and $\tilde{x}$ in order to generate a reconstructed signal.

In one embodiment, the reconstruction function $R_n$ may be defined as follows.

$$R_1(e_1, y) = P_1(y) + e_1$$
$$R_2(e_2, y, \tilde{x}_1) = P_2(y, \tilde{x}_1) + e_2$$
$$\vdots$$
$$R_n(e_n, y, \tilde{x}_1, \ldots, \tilde{x}_{n-1}) = P_n(y, \tilde{x}_1, \tilde{x}_2 \ldots, \tilde{x}_{n-1}) + e_n$$

[Equation 4]

In Equation 4, $P_n$ denotes a type of prediction function formed of the parameters in order to generate a prediction signal.

The prediction function may be, for example, a median function, a combination of a rank order filter and a non-linear function, or a combination of linear functions. Furthermore, each of the non-linear prediction function $P_n( )$ may be a different non-linear function.

In another embodiment of the present invention, a quantization unit 320 may be included in the optimizer 310, or the optimizer 310 may include transform unit.

In another embodiment of the present invention, the encoder 300 and the decoder 400 may include a storage unit of candidate functions for selecting the non-linear prediction function.

In this case, the optimized non-linear prediction function may be selected from candidate functions stored in the storage unit. This is described in more detail with reference to FIGS. 7 and 8.

When an optimized non-linear prediction function is selected as described above, the optimizer 310 may generate an optimized prediction signal using the optimized non-linear prediction function. And, the optimizer 310 may generate an optimized prediction error signal based on the optimized prediction signal, and may perform transform coding on the optimized prediction error signal. The optimizer 310 may output a transform-coded coefficient through the transform coding. In this case, the transform-coded coefficient may mean an optimized transform coefficient.

The output transform coefficient is transmitted to the quantization unit 320. The quantization unit 320 quantizes the transform coefficient and sends the quantized transform coefficient to the entropy encoding unit 330.

The entropy encoding unit 330 may perform entropy encoding on the quantized transform coefficient and output a compressed bitstream.

The decoder 400 of FIG. 4 may receive the compressed bitstream from the encoder of FIG. 3, may perform entropy decoding through the entropy decoding unit 410, and may perform dequantization through the dequantization unit 420. In this case, a signal output by the dequantization unit 420 may mean an optimized transform coefficient.

The inverse transform unit 430 receives the optimized transform coefficient, performs an inverse transform process, and may obtain a prediction error signal through the inverse transform process.

The reconstruction unit 440 may obtain a reconstructed signal by adding the prediction error signal and a prediction signal together. In this case, various embodiments described with reference to FIG. 3 may be applied to the prediction signal.

FIG. 5 is an embodiment to which the present invention may be applied and is a schematic flowchart illustrating an advanced video coding method.

First, when the original video signal is received, the encoder may search for an optimized prediction error vector at step S510. In order to search for the optimized prediction error vector, the encoder may perform decoding simulations.

For example, the encoder may obtain an optimized prediction signal in order to search for the optimized prediction error vector. In order to obtain the optimized prediction signal, the encoder may use all the samples that have already been reconstructed.

In this case, in order to obtain the optimized prediction signal, a non-linear prediction function may be used. A different non-linear prediction function may be adaptively applied to each of prediction signals. The non-linear prediction function may be selected from a storage unit in which candidate prediction functions are stored. In order to select the non-linear prediction function, a previously reconstructed signal and/or a context signal may be used. In this case, the context signal may be a previously reconstructed signal, a previously reconstructed intra-coded signal, portions of the current video frame that have already been reconstructed, or any other information the encoder has sent to the decoder that is relevant to the decoding of the signal to be reconstructed.

In an embodiment of the present invention, the encoder may select the non-linear prediction function by searching for a transform coefficient that minimizes a distortion measurement value between the original video signal and the reconstructed signal and/or a rate measurement value for sending a coded signal and may obtain the optimized prediction signal by selecting the non-linear prediction function.

As a result, the encoder may obtain the optimized prediction error vector by subtracting the obtained optimized prediction signal from the original video signal.

The optimized prediction error vector obtained through such an embodiment may be transmitted to a transform unit in order to generate a transform coefficient. The transform unit may generate a transform coefficient by performing a transform process on the optimized prediction error vector at step S520. In this case, to obtain the prediction error vector and to transform the prediction error vector may be done in one step.

The generated transform coefficient may be compressed through a quantization and entropy coding process and transmitted to the decoder at step S530.

The decoder receives the signal that has been compressed and coded as described above and obtains a prediction error vector through entropy decoding, dequantization, and inverse transform processes. The prediction unit of the decoder generates a prediction signal using all available samples that have already been reconstructed. The embodiments described in connection with the encoder may be applied to the process of generating the prediction signal.

FIG. 6 is an embodiment to which the present invention may be applied and is a flowchart illustrating an advanced video coding method for generating an optimized prediction signal.

In the present embodiment, first, an optimized prediction signal may be generated using previously reconstructed signals $\tilde{x}_1, \tilde{x}_2, \ldots, \tilde{x}_{n-1}$ and a context signal at step S610. For example, the previously reconstructed signals may mean $\tilde{x}_1, \tilde{x}_2, \ldots, \tilde{x}_{n-1}$ defined in Equation 3. Furthermore, a non-linear prediction function may be used to generate the optimized prediction signal, and a different non-linear prediction function may be adaptively applied to each of prediction signals.

The generated prediction signal is added to a received prediction error signal e(i) at step S620, thus generating a reconstructed signal at step S630. Step S620 may be performed by an adder (not illustrated).

The generated reconstructed signal $\tilde{x}_n$ may be stored for future reference at step S640. The stored signal may be used to generate a next prediction signal.

By removing constraints on data that may be used in a process of generating a prediction signal as described above, that is, by generating an optimized prediction signal using all the signals that have already been reconstructed, more advanced compression efficiency can be provided.

A process of generating an optimized prediction signal at step S610 is described in more detail below.

FIG. 7 is an embodiment to which the present invention may be applied and is a flowchart illustrating a process of generating an optimized prediction signal.

As described above with reference to FIG. 6, in accordance with an embodiment of the present invention, an optimized prediction signal p(i) may be generated using previously reconstructed signals $\tilde{x}_1, \tilde{x}_2, \ldots, \tilde{x}_{n-1}$ and a context signal at step S710. In this case, in order to generate the optimized prediction signal, an optimized prediction function f(k) may need to be selected.

A reconstructed signal $\tilde{x}_n$ may be generated using the prediction signal at step S720. The reconstructed signal $\tilde{x}_n$ may be stored for future reference at step S730.

Accordingly, in order to select the optimized prediction function, all the signals $\tilde{x}_1, \tilde{x}_2, \ldots, \tilde{x}_{n-1}$ that have already been reconstructed and a context signal may be used. For example, in accordance with an embodiment of the present invention, a candidate function that minimizes the sum of a distortion component and a rate component may be searched for, and the optimized prediction function may be obtained at step S740.

In this case, the distortion component includes a measurement value of distortion between the original video signal and the reconstructed signal. The rate component includes a measurement value of a rate that is required to send or store a transform coefficient.

More specifically, in accordance with an embodiment of the present invention, the optimized prediction function may be obtained by selecting a candidate function that minimizes Equation 5 below.

$$c^* = \underset{c_1 \in \Omega_1, \ldots, c_n \in \Omega_n}{\mathrm{argmin}} \{D(x, \tilde{x}(c)) + \lambda R(c)\}. \quad \text{[Equation 5]}$$

In Equation 5, c* denotes a "c" value that minimizes Equation 5, that is, a decoded transform coefficient. Furthermore, $D(x,\tilde{x}(c))$ denotes a measurement value of distortion between the original video signal and a reconstructed signal thereof, and R(c) denotes a measurement value of the rate that is required to send or store a transform coefficient "c".

For example, $D(x,\tilde{x}(c))$ may be $\|x-\tilde{x}(c)\|_q$ (q=0, 0.1, 1, 1.2, 2, 2.74, 7, etc.). R(c) may be indicative of the number of bits that is used to store a transform coefficient "c" using an entropy coder, such as a Huffman coder or an arithmetic coder. Alternatively, R(c) may be indicative of the number of bits that is predicted according to an analytical rate model, such as a Laplacian or Gaussian probability model, $R(c)=\|x-\tilde{x}(c)\|\tau$ ($\tau$=0, 0.4, 1, 2, 2.2, etc.).

Meanwhile, λ denotes a Lagrange multiplier used for the optimization of the encoder. For example, λ may be indicative of a real number that keeps the balance between a measurement value of distortion and a measurement value of the rate.

FIG. 8 is an embodiment to which the present invention may be applied and is a flowchart illustrating a method of obtaining an optimized transform coefficient.

The present invention may provide a more advanced coding method by obtaining an optimized transform coefficient that minimizes the sum of a distortion measurement value and a rate measurement value and updating the obtained transform coefficient.

First, the encoder may obtain a transform coefficient that minimizes the sum of a distortion component and a rate component at step S810. For example, Equation 5 may be applied to the sum of the distortion measurement value and the rate measurement value. In this case, the original video signal x, a previously reconstructed signal $\tilde{x}$, and a Lagrange multiplier λ may be used as input parameters. In this case, the previously reconstructed signal may have been obtained based on a previously reconstructed transform coefficient.

When the transform coefficient is obtained through such a process, a previous transform coefficient is updated with a newly obtained transform coefficient at step S820.

A prediction error signal is obtained at step S840 by performing inverse transform on an updated transform coefficient "c" through an inverse transform process at step S830.

The encoder generates a reconstructed signal $\tilde{x}$ using the obtained prediction error signal at step S850. In this case, a context signal may be used to generate the reconstructed signal $\tilde{x}$.

The reconstructed signal may be again used to obtain an optimized transform coefficient that minimizes the sum of a distortion component and a rate component.

Furthermore, the updated transform coefficient may be again used to obtain a newly optimized transform coefficient through a reconstruction process.

Such a process may be performed by the optimizer 310 of the encoder 300. The optimizer 310 outputs a newly obtained transform coefficient, and the output transform coefficient is compressed through quantization and entropy encoding processes and transmitted to a decoder.

An embodiment of the present invention relates to a method of generating a new prediction signal. The prediction signal may be defined as a relationship between previously reconstructed signals and a transform-coded coefficient. In this case, the transform-coded coefficient may be described by Equation 2. As in Equation 2 and Equation 3, each transform-coded coefficient may affect the entire reconstruction process, and allows a long range control of prediction errors encapsulated in a prediction error vector.

In an embodiment of the present invention, the reconstruction process may be constrained to be linear. In such a case, the reconstructed signal may be defined as follows.

$$\tilde{x}=FTc+Hy \quad \text{[Equation 6]}$$

In Equation 6, $\tilde{x}$ denotes a reconstructed signal, c denotes a decoded transform coefficient, and y denotes a context signal. Furthermore, F, T, H denotes an n×n matrix.

In an embodiment of the present invention, an n×n matrix S may be used to control quantization errors included in a transform coefficient. In such a case, the reconstructed signal may be defined as follows.

$$\tilde{x}=FSTc+Hy \quad \text{[Equation 7]}$$

The matrix S for controlling quantization errors may be obtained using a minimization process of Equation 8.

$$\min_S \left\{ \sum_{x \in T} \min_{c_1 \in \Omega_1, \ldots, c_n \in \Omega_n} \{D(x, \tilde{x}(c)) + \lambda R(c)\} \right\} \quad \text{[Equation 8]}$$

In Equation 8, T denotes a training signal, and a transform coefficient "c" is aligned in an n-dimension vector. Transform coefficient components satisfy $C_i \in \Omega_i$. In this case, $\Omega i$ is indicative of a set of discrete values. In general, $\Omega_i$ is determined through a dequantization process to which an integer value has been applied. For example, $\Omega_i$ may be $\{-3\Delta i, -2\Delta i, -1\Delta i, 0\Delta i, 2\Delta i, 3\Delta i, \ldots\}$. In this case, $\Delta i$ is indicative of a uniform quantization step size. Furthermore, each of the transform coefficients may have a different quantization step size.

In an embodiment of the present invention, the n×n matrix F, S, H in Equation 7 may be optimized in common with respect to a training signal. The common optimization method may be performed by minimizing Equation 9.

$$\min_{F,H} \quad \text{[Equation 9]}$$

$$\sum_{\lambda \in \Lambda} \left\{ \min_{S_\lambda} \left\{ \sum_{x \in T} \min_{c_1 \in \Omega_1, \ldots, c_n \in \Omega_n} \{D(x, \tilde{x}(c)) + \lambda R(c)\} \right\} \right\}$$

In Equation 9, $\Lambda = \{\lambda_1, \lambda_2, \ldots \lambda_L\}$ denotes a target set of constraint multipliers, and L is an integer. Furthermore, a reconstruction function in $\lambda$ may be formed as follows.

$$\tilde{x}_\lambda = FS_\lambda Tc + Hy. \quad \text{[Equation 10]}$$

FIG. 9 is an embodiment to which the present invention may be applied and is a schematic flowchart illustrating the operation of the decoder to which the advanced coding method may be applied.

The decoder may receive a bitstream including a transform coefficient obtained according to the present invention, may perform entropy decoding through the entropy decoding unit, and may perform dequantization through the dequantization unit. In this case, a signal output by the dequantization unit may mean an optimized transform coefficient obtained by the encoder. Various embodiments described in this specification may be applied to the optimized transform coefficient.

The decoder may perform an inverse transform process on the received optimized transform coefficient through the inverse transform unit at step S910 and may obtain a prediction error signal through an inverse transform process at step S920.

The decoder generates a reconstructed signal at step S940 by adding up the prediction error signal and a prediction signal through the reconstruction unit at step S930. In this case, various embodiments described in this specification may also be applied to the prediction signal.

The reconstructed signal may be added to an available sample list and stored for future reference at step S950.

The decoder may generate a prediction signal using the reconstructed signal (or sample) included in the available sample list through the prediction unit. Furthermore, the generated prediction signal is added to the prediction error signal at step S930, thus generating a reconstructed signal.

FIGS. 10 and 11 are embodiments to which the present invention may be applied and are conceptual diagrams illustrating a method of applying spatiotemporal transform to a Group of Pictures (GOP).

In accordance with an embodiment of the present invention, spatiotemporal transform may be applied to a GOP including V frames. In such a case, a prediction error signal and a reconstructed signal may be defined as follows.

$$e = T_{st}c \quad \text{[Equation 11]}$$

$$R_1(e_1, y) = P_1(y) + e_1 \quad \text{[Equation 12]}$$
$$R_2(e_2, y, \tilde{x}_1) = P_2(y, \tilde{x}_1) + e_2$$
$$\vdots$$
$$R_n(e_n, y, \tilde{x}_1, \ldots, \tilde{x}_{n-1}) = P_n(y, \tilde{x}_1, \tilde{x}_2 \ldots, \tilde{x}_{n-1}) + e_n$$

In Equation 11, $T_{st}$ denotes a spatiotemporal transform matrix, and c includes the decoded transform coefficient of all the GOPs.

In Equation 12, $e_i$ denotes an error vector formed of error values corresponding to a frame. For example, in the case of an error of a GOP including V frames, $$e = \begin{bmatrix} e^1 \\ \vdots \\ e^V \end{bmatrix}$$

may be defined. In this case, the error vector e may include all the error values of all the GOPs including the V frames.

Furthermore, $\tilde{x}_n$ denotes an $n^{th}$ reconstructed signal, and y denotes a context signal. $R_n$ denotes a non-linear reconstruction function using $e_n$ and y in order to generate a reconstructed signal, and $P_n$ denotes a non-linear prediction function for generating a prediction signal.

FIG. 10 is a diagram illustrating a known transform method in a space domain, and FIG. 11 is a diagram illustrating a method of applying spatiotemporal transform to a GOP.

From FIG. 10, it may be seen that in the existing coding method, transform code in the space domain has been independently generated with respect to each of the error values of I frame and P frame.

In contrast, in the case of FIG. 11 to which the present invention may be applied, coding efficiency can be further improved by applying joint spatiotemporal transform to the error values of I frame and P frame. That is, as can be seen from Equation 12, a video of high quality including a non-smooth or non-stationary signal can be coded more efficiently because a joint spatiotemporal-transformed error vector is used as a cyclic structure when a signal is reconstructed.

FIG. 12 is an embodiment to which the present invention may be applied and is a schematic flowchart illustrating an advanced video coding method.

First, when the original video signal is received at step S1210, the encoder may compare the original video signal with available reconstructed signals at step S1220. And, the encoder may determine a correction signal based on a result of the comparison at step S1230.

In this case, the correction signal may be determined to minimize a sum of a distortion component and a rate component. The distortion component is indicative of total distortion between the original video signal and the correction signal, and the rate component is indicative of a number of bits required to send the transform-coded correction signal. In order to determine a correction signal, the encoder may perform decoding simulations.

This invention may further comprise determining a reconstruction function to be used for the signal reconstruction, and the reconstruction function includes at least one of a linear component and a non-linear component.

And, the reconstruction function may be determined based on all the previously reconstructed samples and the correction signal.

And then, the encoder may generate a transform-coded correction signal to be transmitted for a signal reconstruction at step S1240. Here, the transform-coded correction signal may be multiplied by a dequantization matrix and an inverse-transform matrix, and wherein the dequantization matrix may be selected for controlling a bit-rate and quantization errors.

Furthermore, the transform-coded correction signal may correspond to the correction signal for a group of pictures and a spatiotemporal transform coding may has been applied to the correction signal.

In accordance with an embodiment of the present invention, the decoder may receive a bitstream including a transform-coded correction signal obtained according to the present invention, may perform entropy decoding through the entropy decoding unit, may perform dequantization through the dequantization unit, and may perform inverse transform through the inverse transform unit. The decoder may obtain a correction signal by performing inverse-transform to the transform-coded correction signal.

And then the decoder may obtain a reconstructed signal using a reconstruction function that combines the obtained correction signal and a context signal. Here, the context signal may be obtained based on all previously reconstructed samples.

Furthermore, the decoder may determine a reconstruction function to be used for the signal reconstruction, and the reconstruction function may include at least one of a linear component and a non-linear component. Here, the reconstruction function may be determined based on all the previously reconstructed samples and the correction signal.

The transform-coded correction signal may be multiplied by a dequantization matrix and an inverse-transform matrix. Also, the transform-coded correction signal may correspond to the correction signal for a group of pictures and a spatiotemporal transform coding has been applied to the correction signal.

FIGS. 13 to 17 are embodiments to which the present invention may be applied.

This invention defines an improvement on techniques for compression of media signals, like audio, images and video. The majority of the media compression techniques are based on two approaches, called predictive coding and transform coding, and the most adopted, especially for video coding is a particular combination of the two, called hybrid coding, which combines some advantages of both, but not all, while adding some strong constraints on their combination.

This invention is based on a novel and previously unused fusion of predictive and transform coding, which is capable of better integration of their properties, and allows better exploitation of the advantages of each method, in a much more general technique.

FIG. 13 shows a diagram for a general form of media coding, including all components needed for predictive, transform and hybrid coding.

Predictive coding (or DPCM) is one of the most fundamental tools for signal compression, and corresponds to the diagram of FIG. 0 if we assume that the linear transform is the identity transform. It is based predicting signal components utilizing parts of the same signal that have already been coded, and coding the numerical difference between predicted and actual values. It follows from information theory that signals (or signal components) that are more accurately predicted can be compressed more efficiently (i.e., represented with a smaller number of bits). Better compression is obtained by increasing the consistency and accuracy of prediction.

The main properties of predictive coding are

Since it is based on causal statistical relationships, it can exploit short-range inferences, and thus is better for dealing with non-smooth and non-stationary signals;

It can be easily extended to advanced adaptive forms, including non-linear prediction, specialized in exploiting particular signal properties, like image edges and video motion.

It is not efficient in handling signal features at large scales.

Since it applies quantization directly to the original signal, it cannot fully exploit limitations of the human visual and auditory systems.

In FIG. 12, transform coding corresponds to the case where prediction is identically zero, and linear transform is different from identity. Typically it is an orthogonal transformation like the discrete cosine transform (DCT) or the discrete wavelet transform (DWT). Transform coding decomposes the signal in a set of components, making it possible to identify which are most important. In fact, after quantization, most of the transform coefficients are zero.

Among the properties of transform coding we have:

It needs to aggregate signal samples in blocks of a certain size before transformation and coding.

It can exploit large-scale media features, ranging from smooth variations to tonal components and periodic image patterns;

When the signal is decomposed into frequency bands, it is possible to account for the relative sensitivity of the human visual and auditory systems at those frequencies.

Applying quantization in the transform domain makes it easier to make its effects less perceptible, but can also create artifacts in the block boundaries.

As shown in the diagram in FIG. 12, it is conceptually straightforward to combine predictive and transform coding, aiming to combine the advantages of both, and such combination is called hybrid coding.

However, it is necessary to be careful when putting the two coding techniques together. Predictive coding can be applied to individual samples at each time. In fact, the most powerful methods for prediction have a recursive structure, exploiting the fact that a signal value can be best predicted using values that are in a sense 'nearest'. This means that after a predicted value is coded, it is best if it is immediately used for predicting other values. The problem of using this approach in hybrid coding is that prediction residuals have to be grouped before the transform is applied. Since signals are not recovered exactly, recursive prediction can produce increasing accumulation of error.

Two solutions are currently used to solve this problem. The first separate prediction and transform in two orthogonal (or independent) dimensions. For example, in video it is common to apply prediction along the time dimension, followed by transforms in the spatial dimensions. The second solution is to base prediction only from data in blocks that already have been coded. This eliminates the problem of error propagation, but it forces prediction to employ data that has a smaller statistical correlation with some of the data samples within a block, degrading performance.

This invention addresses this problem, eliminating the constraints on the data that can be used for making predictions, and enabling a form of hybrid coding that truly integrates the advantages of predictive and transform coding.

$\tilde{x}$: The reconstructed signal. The reconstructed signal is lexicographically ordered into an n-dimensional vector.

y: The context signal that is initially available to both the encoder and the decoder. The context signal is lexicographically ordered into a k-dimensional vector.

c: The decoded coefficients. The decoded coefficients are lexicographically ordered into an n-dimensional vector. The components of c (i.e., the coefficients $c_i$, i=1, ..., k) satisfy $c_i \in \Omega_i$, where $\Omega_i$ denotes a set of discrete values. $\Omega_i$ is typically determined through de-quantization process applied to integer values, for example, uniform quantization reconstruction values as in $\Omega_i = \{ \ldots, -3\Delta_i, -2\Delta_i, -\Delta_i, 0, \Delta_i, 2\Delta_i, 3\Delta_i, \ldots \}$. Here $\Delta_i$ is the uniform quantizer step-size and corresponds to a real number (e.g., 3.2675, 7.001, 0.0013, and so on). Notice that each coefficient can have a different step-size assigned to it. The $i^{th}$ component of the vector v is denoted by $v_i$.

Given the decoded coefficient, c, and the context signal, y, the most general reconstructed signal can be formed as $$\tilde{x}=R(c,y) \quad \text{[Equation 13]}$$

where R(c,y) denotes a nonlinear reconstruction function that uses y and c to construct $\tilde{x}$.

This invention discloses special format reconstruction functions that have similar complexity to current decoders but allow for advanced reconstructions that gives substantially improved compression results. In order to better understand the following details let us first consider the conventional linear reconstructions. In the linear case the reconstructed signal is formed as $$\tilde{x}=FTc+Hy \quad \text{[Equation 14]}$$

where F(n×n), T(n×n), and H(n×k) are matrices. The following important specializations can be identified:

In traditional DPCM, $$F = \begin{bmatrix} 1 & 0 & & & 0 \\ f_{2,1} & 1 & & & 0 \\ f_{3,1} & f_{3,2} & \ddots & & 0 \\ \vdots & \vdots & & & \vdots \\ f_{n,1} & f_{n,2} & & & 1 \end{bmatrix} \quad \text{[Equation 15]}$$

H is an arbitrary n×k matrix so that Hy is the linear prediction using the context signal, and T=1 (i.e., the identity matrix) since DPCM quantizes and codes prediction errors without applying a transform. Therefore in traditional DPCM the reconstruction takes the form $$\tilde{x}_{dpcm}=Fc+Hy. \quad \text{[Equation 16]}$$

In traditional transform coding on the other hand, F=1, H=0, which leads to $$\tilde{x}_{tc}=Tc \quad \text{[Equation 17]}$$

Typically an orthonormal transform is used so that T is restricted to be orthonormal.

In a variation of the traditional transform coding (sometimes referred to as hybrid coding) the prediction from the context signal is utilized so that $$\tilde{x}_h=Tc+Hy \quad \text{[Equation 18]}$$

The advantage of DPCM is that one can utilize very advanced predictors (through well-designed F matrices) and DPCM can more easily be generalized to powerful nonlinear predictors. Its disadvantage is that it does not exploit large scale dependencies since the prediction error for each sample is encoded independently. Transform/Hybrid coding on the other hand can exploit large scale dependencies but is limited to only those dependencies that can be exploited with a linear, usually orthonormal transform. Exploitable dependencies are hence typically limited to smooth and stationary signals. As we will see below, unlike existing work, this invention provides techniques for adapting to large scale dependencies involving non-smooth and non-stationary signals with the help of advanced nonlinear predictors.

Concentrating on the way reconstructions are formed, this work can be seen as computing, $$e = Tc, \quad \text{[Equation 19]}$$
$$\tilde{x}_1 = R_1(e_1, y),$$
$$\tilde{x}_2 = R_2(e_2, y, \tilde{x}_1)$$
$$\vdots$$
$$\tilde{x}_n = R_n(e_n, y, \tilde{x}_1, \ldots, \tilde{x}_{n-1})$$

where $R_i$ are nonlinear reconstruction functions of the indicated variables (FIG. 13).

$R_i$ can, for example, be, $$R_1(e_1, y) = P_1(y) + e_1, \quad \text{[Equation 20]}$$
$$R_2(e_2, y, \tilde{x}_1) = P_2(y, \tilde{x}_1) + e_2$$
$$\vdots$$
$$R_n(e_n, y, \tilde{x}_1, \ldots, \tilde{x}_{n-1}) = P_n(y, \tilde{x}_1, \ldots, \tilde{x}_{n-1}) + e_n,$$

where $P_i$ are nonlinear prediction functions of the indicated variables (FIG. 14)

$P_i$ can, for example, be the median function (e.g., median $(y_3, y_{11}, y_k, \tilde{x}_1, \tilde{x}_{20}, \tilde{x}_{n-2})$), can be a polynomial function (e.g., $y_{12}+2y_{11}^4, +71.3y_k^2-\tilde{x}_1^6+11.213\tilde{x}_5^2-\tilde{x}_{n-1}$), can be a rank order filter (e.g., $0.013 \max(y_1, y_4)+9.01 \min(\tilde{x}_2, \tilde{x}_5, \tilde{x}_{n-7})$), etc. $P_i$ can also incorporate linear as well as nonlinear combinations of simple nonlinearities.

Observe that each $P_i$ can be a different nonlinear function. In one embodiment, one has a dictionary of candidate functions for each $P_i$ and the previously reconstructed values and the context signal are used to select a function from this dictionary (FIG. 15). This selection can for example be done by choosing that dictionary function that minimizes [equation 21] over the previously reconstructed values.

In this invention c is found by solving the minimization (FIG. 16)

$$c^* = \underset{c_1 \in \Omega_1, \ldots, c_n \in \Omega_n}{\operatorname{argmin}} \{D(x, \tilde{x}(c)) + \lambda R(c)\} \quad \text{[Equation 21]}$$

where $D(x,\tilde{x}(c))$ is a measure of distortion between the original signal and its reconstruction (e.g., $D(x,\tilde{x}(c))=\|x-\tilde{x}(c)\|_q$ with q=0, 0.01, 1, 1.2, 2, 2.74, 7, etc.) and R(c) is a measure of the rate used to communicate or store c (e.g., the number of bits used to store L using an entropy coder such as a Huffman coder or an arithmetic coder, the number of bits predicted by an analytical rate model such as a Laplacian or generalized Gaussian probability model, $R(c)=\|x-\tilde{x}(c)\|_r$ with r=0, 0.4, 1, 2, 2.2, etc.) In [equation 21], $\lambda$ is a real number that trades off the relative importance of distortion to rate. $\lambda$ can be seen as enforcing a constrained optimization where the distortion minimization is done subject to a rate constraint. It can hence be set by well-known techniques in optimization. The optimization in [equation 21] (in effect the update step in FIG. 16 can be solved by nonlinear optimization techniques, by gradient descent based optimization techniques, and under certain mathematical conditions on the form of $D(\bullet, \bullet)$ and $R(\bullet)$, by techniques as disclosed in.

It is important to note that the predictors are defined in terms of previously reconstructed values and c, i.e., the main input driving the reconstructions, is transform coded as illustrated in [equation 19]. Hence, it is clear that each decoded coefficient, $c_i$, affects the entire reconstruction and, as shown in [equation 20], allows long range control of prediction errors encapsulated in the vector e. It should be appreciated that this very different from DPCM, transform coding, hybrid coding, and other forms of techniques in the prior art. In particular the optimization in [equation 21] is substantially more elaborate compared to existing techniques.

In one embodiment, rather than reconstructing $\tilde{x}$, the invention reconstructs a vector, $\tilde{z}=g(\tilde{x})$, that is one-to-one related to $\tilde{x}$. Here $g(\bullet)$ denotes a one-to-one or reversible function. This one-to-one function could be a simple reordering of the components of $\tilde{x}$ (e.g., $\tilde{z}_1=\tilde{x}_2$, $\tilde{z}_2=\tilde{x}_3$, ..., $\tilde{z}_{n-1}=\tilde{x}_n$, $\tilde{z}_n=\tilde{x}_1$), could involve an invertible matrix so that reconstruction is initially done in some other linear transform domain (e.g., $\tilde{z}=A\tilde{x}$ with $AA^{-1}=1$), or could be a more general invertible nonlinear map. Once $\tilde{z}$ is reconstructed $\tilde{x}$ is formed by $\tilde{x}=g^{-1}(\tilde{z})$. In one embodiment, the reconstructions are constrained to be linear. The invention then forms the reconstruction, $$\tilde{x}=FTc+Hy \quad \text{[Equation 22]}$$

In one embodiment a matrix S (n×n) is utilized to condition the quantization error embodied in c so that the reconstruction, $$\tilde{x}=FSTc+Hy \quad \text{[Equation 23]}$$

is formed. Let T denote a training set of signals. In one embodiment S is chosen using the following minimization $$\min_{S}\left\{\sum_{x\in T}\min_{c_1\in\Omega_1,\ldots,c_n\in\Omega_n}\{D(x_c\tilde{x}(c))+\lambda R(c)\}\right\}, \quad \text{[Equation 24]}$$

where $\tilde{x}$ is obtained as in (10). In another embodiment F, S, and H are jointly optimized over the training set. Let $\Lambda=\{\lambda_1, \lambda_2, \ldots, \lambda_L\}$ denote a target set of constraint multipliers given an integer L (e.g., L=1, 2, 13, 174, etc.). The joint optimization is done by minimizing $$\min_{F,H}\sum_{\lambda\in\Lambda}\left\{\min_{S_\lambda}\left\{\sum_{x\in T}\min_{c_1\in\Omega_1,\ldots,c_n\in\Omega_n}\{D(x,\tilde{x}(c))+ \quad \text{[Equation 25]}$$

$$\lambda R(c)\}\right\}\right\},$$

with the reconstruction at $\lambda$ formed via $$\tilde{x}_\lambda=FS_\lambda Tc+Hy \quad \text{[Equation 26]}$$

The encoder block diagram is illustrated in FIG. 5 and the decoder block diagram in FIG. 3.

In one embodiment the invention is applied to video signals over a group of V video frames (or group of pictures, GOP). V can for example be 1, 2, 10, 15, 30, 1219, etc.

$$e=T_{st}c, \quad \text{[Equation 27]}$$
$$R_1(e^1,y)=P_1(y)+e^1,$$
$$R_2(e^2,y,\tilde{x}^1)=P_2(y,\tilde{x}^1)+e^2$$
$$\vdots$$
$$R_n(e^n,y,\tilde{x}^1,\ldots,\tilde{x}^{n-1})=P_n(y,\tilde{x}^1,\ldots,\tilde{x}^{n-1})+e^n,$$

where $T_{st}$ corresponds to a spatiotemporal transform used in compression, c contains the decoded transform coefficients for the entire GOP, $e^i$ is a vector formed by error values that correspond to frame i, $$e=\begin{bmatrix}e^1\\ \vdots \\ e^V\end{bmatrix}$$

is the vector containing error values for the entire GOP, $\tilde{x}^i$, is the $i^{th}$ reconstructed video frame, and encapsulates motion compensated prediction for frame i. Compared to traditional hybrid video compression which applies temporal prediction followed by independent spatial transforms, this technique can be seen as generating a joint spatiotemporal transform code (FIGS. 11 & 12).

Unlike techniques like DPCM, statistical dependencies over prediction error samples are fully exploited as each transmitted/decoded coefficient impacts the entirety of the prediction error vector.

Unlike traditional techniques, the invention can readily exploit nonlinear dependencies.

Several signal classes can be accommodated due to conditional/situational predictions.

Allows for signal-adaptive decoder behavior without the need for side-information.

Combines the advantages of DPCM and transform coding.

Replaces linear and nonlinear predictive coding that is coupled with transform coding with a unified nonlinear transform block.

Replaces hybrid coding (DPCM followed by transform coding) with transform coding with a unified nonlinear transform block.

Results in higher quality prediction and smaller prediction errors compared to hybrid coders.

Does not suffer from quantization error propagation problems since quantization error is fully accounted for and controlled.

Does not suffer from encoder-decoder asymmetry that would be encountered in some open-loop DPCM/transform combinations.

Allows for better control of the effects of quantization error in posterior prediction.

Allows for advanced spatiotemporal video compression.

Not handicapped like previous 3D-transform approaches since the designed spatiotemporal transform code automatically embody inter and spatial prediction, etc., within itself.

Properties of video data such as motion dependencies, spatial edges, etc., require sophisticated spatiotemporal transforms that exploit statistical dependencies over motion trajectories and edges. These transforms are very hard to design. By marrying DPCM with transform coding, CNT bypasses these issues and in effect designs such transforms by using simple transforms and predictors.

As described above, the decoder and the encoder to which the present invention may be applied may be included in a multimedia broadcasting transmitter/receiver and may be used to decode video signals and data signals. Furthermore, the multimedia broadcasting transmitter/receiver may include a mobile communication terminal.

Furthermore, the decoding/encoding method to which the present invention may be applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bitstream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of encoding a video signal, comprising:
receiving an original video signal;
generating a n-th reconstruction vector signal ($\tilde{x}_n$) for the original video signal,
wherein the n-th reconstruction vector signal ($\tilde{x}_n$) is generated based on a previously reconstructed signal ($\tilde{x}_1, \tilde{x}_2, \ldots, \tilde{x}_{n-1}$) and a transform-coded residual signal, and
wherein the previously reconstructed signal ($\tilde{x}_1, \tilde{x}_2, \ldots, \tilde{x}_{n-1}$) indicates a signal accumulated by recursively performing a reconstruction process based on previously reconstructed pixels and previously stored for the generating a n-th reconstruction vector signal ($\tilde{x}_n$); and
determining an optimal transform coefficient based on the n-th reconstruction vector signal ($\tilde{x}_n$),
wherein the optimal transform coefficient is determined to minimize a sum of a distortion component and a rate component,
wherein the distortion component indicates total distortion between the original video signal and the n-th reconstruction vector signal ($\tilde{x}_n$), and
wherein the rate component indicates a number of bits required to transmit the optimal transform coefficient.

2. The method of claim 1, further comprising:
generating a prediction vector signal for the original video signal,
wherein the prediction vector signal is generated based on the previously reconstructed signal and a context signal, and
wherein the context signal includes at least one of a previously reconstructed pixel, a previously reconstructed intra-coded pixel, or coding information related to a previously reconstructed portion.

3. The method of claim 2,
wherein the prediction vector signal is determined based on an optimal prediction function,
wherein the optimal prediction function is selected from predetermined candidate prediction functions based on at least one of the previously reconstructed signal or the context signal.

4. The method of claim 3,
wherein the optimal prediction function is a non-linear function, and
wherein the optimal prediction function is applied differently for each of the prediction vector signal.

5. The method of claim 1,
wherein the optimal transform coefficient corresponds to a residual vector signal for a group of pictures and a spatiotemporal transform coding has been applied to the residual vector signal.

6. A method of decoding a video signal, comprising:
receiving an optimal transform coefficient;
obtaining a residual vector signal by performing an inverse-transform to the optimal transform coefficient; and
reconstructing the video signal by adding the residual vector signal to a prediction vector signal,
wherein the prediction vector signal is determined based on the previously reconstructed signal ($\tilde{x}_1, \tilde{x}_2, \ldots, \tilde{x}_{n-1}$) or a context signal, and
wherein the previously reconstructed signal ($\tilde{x}_1, \tilde{x}_2, \ldots, \tilde{x}_{n-1}$) indicates a signal accumulated by recursively performing a reconstruction process based on previously reconstructed pixels and previously stored for generating the prediction vector signal,
wherein the optimal transform coefficient is determined to minimize a sum of a distortion component and a rate component,
wherein the distortion component indicates total distortion between the original video signal and the n-th reconstruction vector signal ($\tilde{x}_n$), and
wherein the rate component indicates a number of bits required to transmit the optimal transform coefficient.

7. The method of claim 6,
wherein the prediction vector signal is determined based on the optimal prediction function, and
wherein the optimal prediction function is selected from predetermined candidate prediction functions based on at least one of the previously reconstructed signal or the context signal.

8. The method of claim 6,
wherein the context signal includes at least one of a previously reconstructed pixel, a previously reconstructed intra-coded pixel, or coding information related to a previously reconstructed portion.

9. The method of claim 6,
wherein the optimal transform coefficient corresponds to a residual signal for a group of pictures and a spatiotemporal transform coding has been applied to the optimal transform coefficient.

10. An apparatus of encoding a video signal, comprising:
a receiving unit configured to receive an original video signal;
an optimization unit configured to generate a n-th reconstruction vector signal ($\tilde{x}_n$) for the original video signal, and determine an optimal transform coefficient based on the n-th reconstruction vector signal ($\tilde{x}_n$),
wherein the n-th reconstruction vector signal ($\tilde{x}_n$) is generated based on a previously reconstructed signal ($\tilde{x}_1, \tilde{x}_2, \ldots, \tilde{x}_{n-1}$) and a transform-coded residual signal, and
wherein the previously reconstructed signal ($\tilde{x}_1, \tilde{x}_2, \ldots, \tilde{x}_{n-1}$) indicates a signal accumulated by recursively performing a reconstruction process based on previously reconstructed pixels and previously stored for the generating a n-th reconstruction vector signal ($\dot{x}_n$),
wherein the optimal transform coefficient is determined to minimize a sum of a distortion component and a rate component,
wherein the distortion component indicates total distortion between the original video signal and the n-th reconstruction vector signal ($\tilde{x}_n$), and
wherein the rate component indicates a number of bits required to transmit the optimal transform coefficient.

11. The apparatus of claim 10,
wherein the optimization unit is further configured to generate a prediction vector signal for the original video signal,
wherein the prediction vector signal is generated based on the previously reconstructed signal ($\tilde{x}_1, \tilde{x}_2, \ldots, \tilde{x}_{n-1}$) and a context signal, and
wherein the context signal includes at least one of a previously reconstructed pixel, a previously reconstructed intra-coded pixel, or coding information related to a previously reconstructed portion.

12. The apparatus of claim 11,
wherein the prediction vector signal is determined based on an optimal prediction function,
wherein the optimal prediction function is selected from predetermined candidate prediction functions based on at least one of the previously reconstructed signal ($\tilde{x}_1, \tilde{x}_2, \ldots, \tilde{x}_{n-1}$) or the context signal.

13. An apparatus of decoding a video signal, comprising:
a receiving unit configured to receive an optimal transform coefficient;
an inverse-transform unit configured to obtain a residual vector signal by performing an inverse-transform to the optimal transform coefficient; and
a reconstruction unit configured to reconstruct the video signal by adding the residual vector signal to a prediction vector signal,
wherein the prediction vector signal is determined based on the previously reconstructed signal or a context signal, and
wherein the previously reconstructed signal ($\tilde{x}_1, \tilde{x}_2, \ldots, \tilde{x}_{n-1}$) indicates a signal accumulated by recursively performing a reconstruction process based on previously reconstructed pixels and previously stored for generating the prediction vector signal,
wherein the optimal transform coefficient has been determined to minimize a sum of a distortion component and a rate component,
wherein the distortion component indicates total distortion between the video signal and the reconstructed video signal, and
wherein the rate component indicates a number of bits required to transmit the optimal transform coefficient.

14. The apparatus of claim 13,
wherein the prediction vector signal is determined based on the optimal prediction function, and
wherein the optimal prediction function is selected from predetermined candidate prediction functions based on at least one of the previously reconstructed signal ($\tilde{x}_1, \tilde{x}_2, \ldots, \tilde{x}_{n-1}$) or the context signal.

* * * * *